United States Patent [19]

Pisoni

[11] Patent Number: 4,894,003
[45] Date of Patent: Jan. 16, 1990

[54] CONTROL SYSTEM FOR MOLDING MACHINES OF PASTY PRODUCTS

[75] Inventor: Ottorino Pisoni, Busto Arsizio, Italy

[73] Assignee: Meccaniche Moderne S.r.l. Chemical Plants Division, Busto Arsizio, Italy

[21] Appl. No.: 201,479

[22] Filed: Jun. 1, 1988

[51] Int. Cl.$^4$ .............................................. B29C 33/30
[52] U.S. Cl. ...................................... 425/399; 425/416; 425/422; 425/437
[58] Field of Search ........ 425/256, 258, 260, 398–400, 425/406, 409, 410, 416, 418, 422, 423, 437, 453, 454, 444

[56] References Cited

U.S. PATENT DOCUMENTS

| | | | |
|---|---|---|---|
| 2,852,809 | 9/1958 | Miles et al. | 425/258 X |
| 2,959,900 | 11/1960 | Wollett | 425/258 X |
| 3,222,748 | 12/1965 | Lamb | 425/256 X |
| 3,893,791 | 7/1975 | Plocher et al. | 425/258 X |
| 3,905,735 | 9/1975 | Thomas et al. | 425/256 |
| 4,252,513 | 2/1981 | Kalnins | 425/256 X |
| 4,302,173 | 11/1981 | Persson | 425/256 X |
| 4,563,144 | 1/1986 | Rose | 425/256 X |
| 4,692,111 | 9/1987 | Wagner | 425/400 X |

Primary Examiner—Richard L. Chiesa
Attorney, Agent, or Firm—Bucknam and Archer

[57] ABSTRACT

In a molding machine for soap and similar materials, the control systems applied to the feed, molding, processing and discharge members totally or partially consist of pneumatic and/or oleodynamic pistons. The control systems are preferably applied to the grippers of the pieces to be molded, to the mobile upper mold, to the centering device and to the device controlling the rotation of the lower die and to the device for controlling the sucker type extraction of the pieces already molded. The control systems of this invention can totally or partially replace the present control systems of mechanical type. The combination of conventional mechanical systems with those of this invention may vary according to individual requirements.

4 Claims, 3 Drawing Sheets

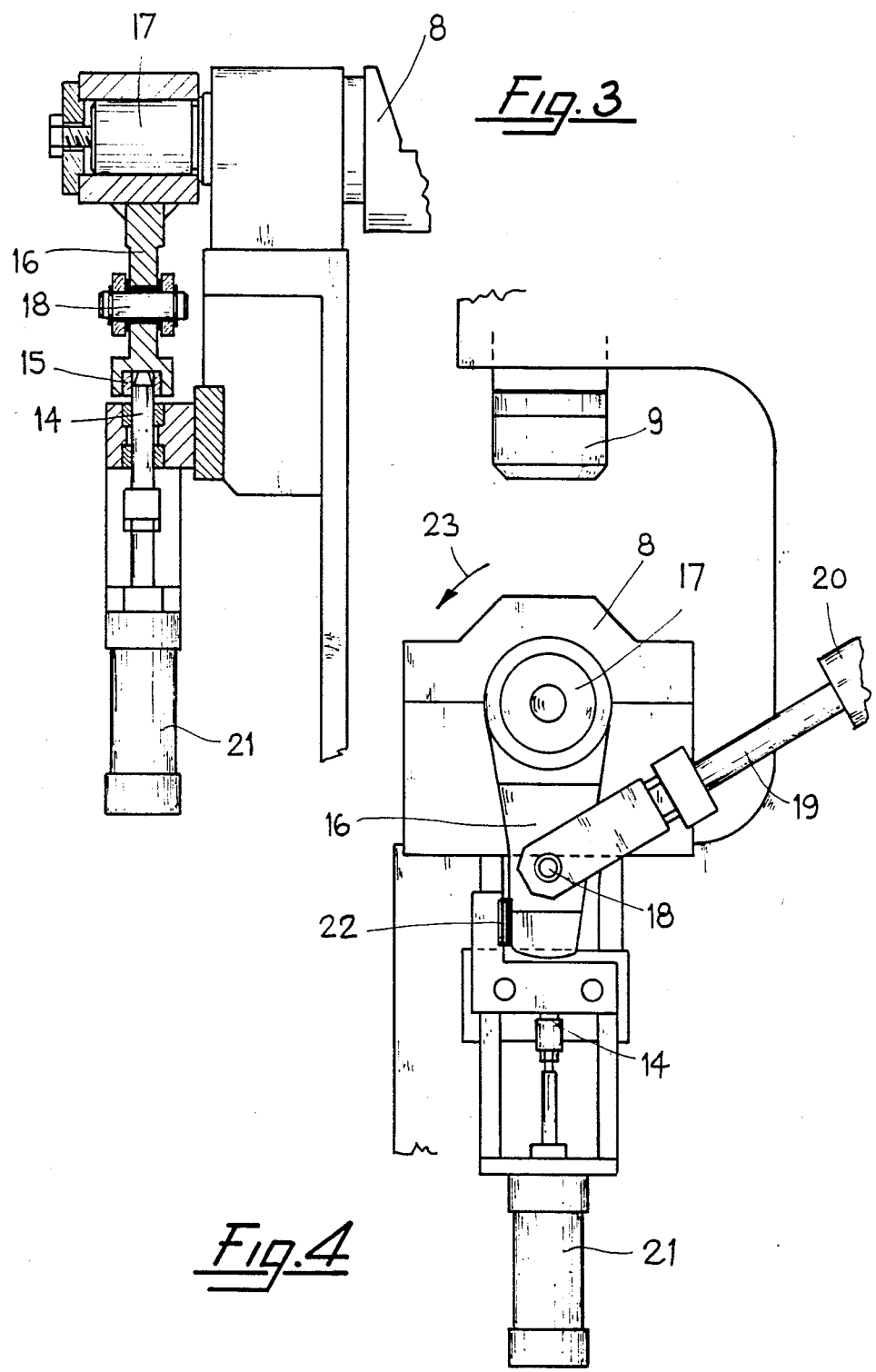

4,894,003

CONTROL SYSTEM FOR MOLDING MACHINES OF PASTY PRODUCTS

DESCRIPTION OF THE PRIOR ART

It is noted that the present molding machines of pasty products, like soap and similar materials, are of different types, in particular horizontal, vertical and others, automatic or nonautomatic, to mold pieces of soap of any shape; with or without band.

In molding machines with vertical alternate motion, the pieces of soap are fed by a conveyor belt, which advances with intermittent motion.

From this belt the pieces of soap, or similar, are withdrawn by means of two mechanical pliers which place them on the lower die of the mold; then the upper mold, controlled by connecting rod and crank, descends, engraving the soap as required.

In the opening phase of the mold, after the molding phase, the lower die is freed by the mechanical aligning device and is laterally rotated by the action of a movement with a cam device or similar.

A sucker is placed in perfect alignment with the piece, or pieces, of soap or similar materials, already molded; this sucker removes the molded pieces from the die and puts them on a discharge belt. The forward and backward movement of the extraction sucker is obtained by means of mechanical parts, e.g. levers or cams.

The mechanical systems of grip, molding, centering, rotation and extraction of the pieces of soap or similar materials, used for these operations, while perfectly functional and guaranteeing acceptable production levels, generally about 30 to 120 pieces per minute, are not completely satisfactory, particularly for certain applications.

In particular, as these systems are totally constructed with mechanical parts, they have a fairly complex structure, need very precise processings and are therefore very expensive. Another problem consists of the fact that the mechanical parts need much time for assembly, regulation and periodic maintenance.

Another problem is that the molding machines equipped with all control systems of mechanical type have, as a whole, a rather complex structure, of considerable weight and sometimes difficult to instal due to its bulk. Another problem is that the total cost of these molding machines, for plants of modest or medium production, is excessive and difficult to amortize.

All these problems are also met in the horizontal molding machines and in others.

The object of this invention is to eliminate the above problems

SUMMARY OF THE INVENTION

In its more general aspect, the object of this invention resides in substituting totally or partially the control systems of mechanical type with pneumatic or oleodynamic ones. Therefore, according to this invention, the control means applied to the grippers of the pieces to be molded, to the upper mold, to any centering device and rotation device of the lower die and to the extraction means of the pieces already molded, are composed, at least in part, of pneumatic or oleodynamic systems.

According to this invention, the movement of the various parts forming the molding machines is substantially obtained by means of pneumatic or oleodynamic pistons; therefore each part controlled by these pistons is of simpler, lighter, less bulky and at any rate more functional structure.

The advantages of this invention mainly consist of the fact that the costs of construction, assembly, installation and maintenance are decidedly limited, and the molding machines, while less fast as a whole, are at any rate competitive from the economic point of view as they widely cover the market range of the small and medium productions and can be effectively used also for large productions thanks to their general characteristics, their very limited dimensions, and to their modes construction and maintenance costs. For a better understanding of operation and constructive characteristics of the control systems of this invention, a detailed description follows, referring to the enclosed drawings which show a preferred, illustrative but unbinding version of this invention.

BRIEF DESCRIPTION OF THE DRAWINGS

FIG. 3 shows a schematic view of the cross-section of a centering means of the lower die;

FIG. 4 shows a front schematic view of the centering means of FIG. 3; and

DESCRIPTION OF THE PREFERRED EMBODIMENTS

Figure 1:
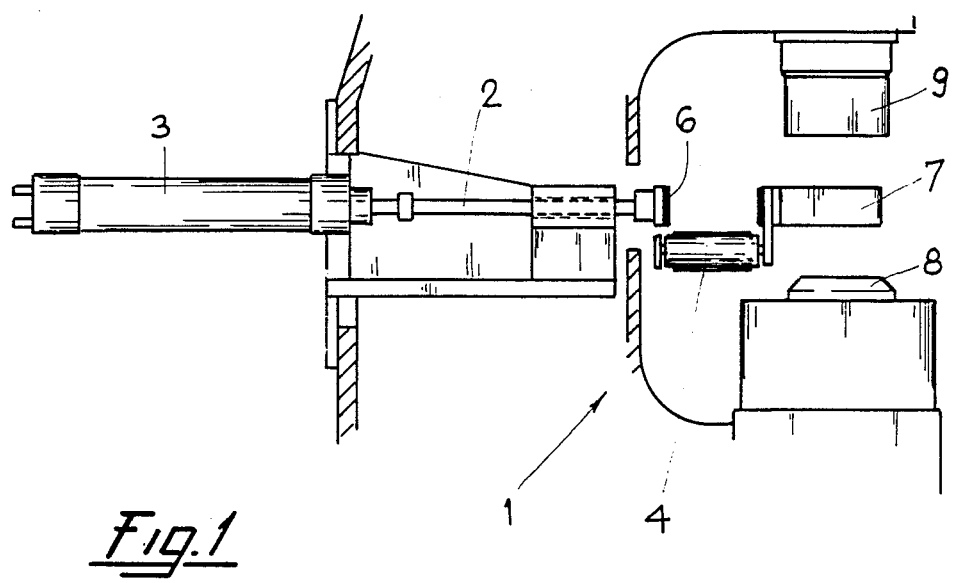
FIG. 1 shows a side schematic view of the grippers of the pieces to be molded.

The figures illustrate the control systems for molding machines of pasty products, like soap and similar, comprising at least one gripper of the pieces to be molded, possibly a centering device for lower dies, at least one rotation device for lower dies and at least one control member of the sucker type extractor means of the pieces already molded, the control systems being equipped with pneumatic, hydraulic or mixed pistons.

The control systems simultaneously or partially on the molding machines according to the particular needs.

A preferred construction of a gripper substantially consists of a transversal fork 2 provided at its free end with a pusher 6 and controlled intermittently by a rear piston 3. The fork 2 is applied in alignment with the conveyor belt 4, on which, for example, the pieces of soap 5 are sent to molding. When the piece or pieces of soap 5 reach the alignment position with the fork 2, the belt 4 stops and the rear piston 3 makes this fork move forward.

Figure 2:
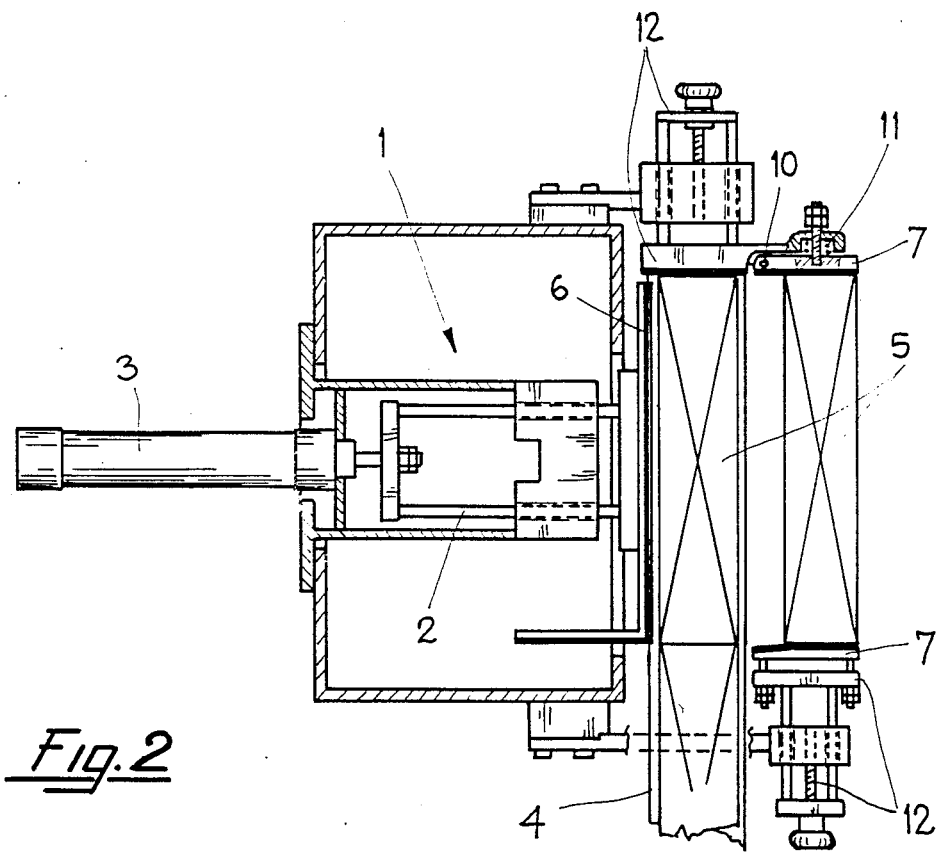
FIG. 2 shows the schematic view in plan of the grippers of FIG. 1.

In the forward movement, the pusher 6, applied on the front of fork 2, pushes the pieces of soap 5 between two jaws 7 aligned with the lower fixed die 8 and the upper mobile mold 9. The pieces of soap 5, or similar material, are engaged between the jaws 7 thanks to the fact that at least one of them, for example the upper one (see FIG. 2) is elastically mobile, supported in 10 and held in pressure-position by a spring 11 with adjustable pressure.

Jaws 7 are also equipped with position adjusters 12, preferably of mechanical screw type, through which the exact position of the pieces 5 to be molded is established. In alignment position with the die 8 and mold 9, the pieces 5 are subjected to the molding action by lowering of the upper mobile mold 9. Mold 9 is lowered by an upper vertical piston 13 (see FIG. 5) preferably of mixed type, i.e.: pneumatic for the approach and return strokes and oleodynamic with multiplication for the molding action. In this way the system is simpler, the advance and return stroke is rapid and the work load for the molded pieces can be greatly reduced, e.g. from 300 to 3000 Kg. During molding, the lower die 8 is preferably maintained in its exact alignment position with the mobile upper mold 9 by means of at least one bolt 14 which is inserted in the special centering seat 15, obtained on at least one of the side levers 16 applied to the ends 17 of the pins on which the die 8 is fixed. On at least one side lever 16 is supported at 18 the end of the control rod 19 of a piston 20.

The bolt or bolts 14 are controlled by pistons 21. In the operating phase, the lower die 8 is kept perfectly aligned with the upper mobile mold 9 by means of piston 20. When the rod 19 is fully extended, the side lever or levers 16 are pushed into contact with limit stops 22; in this position, the bolt or bolts 14 are inserted in the corresponding seats 15 by piston 21.

Figure 5:
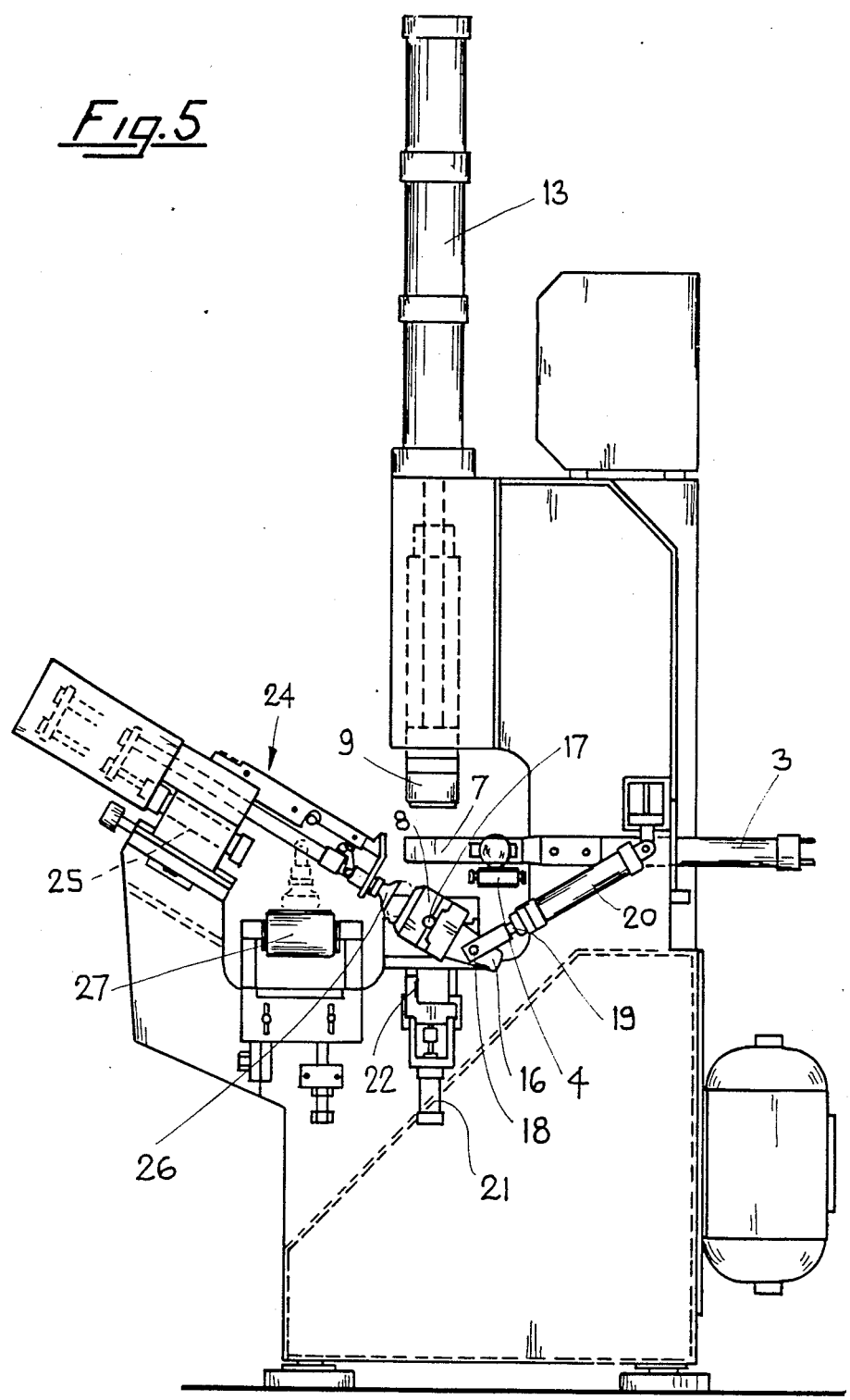
FIG. 5 shows a side schematic overall view of a molding machine equipped with basic control systems of type with pistons according to this invention.

When molding is complete, the mobile upper mold 9 is raised by piston 18, bolt or bolts 14 are extracted from seats 15 and side lever or levers 16 are moved in opposite direction from the piston/pistons 20 in such a way as to make the lower die 8 rotate in the direction of arrow 23, thus positioning it obliquely and in alignment with extractor means 24, as illustrated in FIG. 5. This extractor means 24 mainly consists of a pneumatic control piston 25 and suckers 26 fixed to the free end of the piston.

The rod of piston 25 is moved forward until it brings its suckers 26 into contact with pieces 5 already molded. The reverse movement of the extractor means 24 causes removal of the molded pieces 5 from the die 8 and their subsequent deposit on a discharge belt 27, according to already known methods. Subsequently, the lower die 8 is brought into alignment position with the upper mold 9 by extension of rod 19 and is locked by bolt/bolts 14. The feed belt 4 restarts carrying a new piece/pieces of soap, or similar material, 5 to be molded in alignment with pusher 6 of form 2 and the work cycle is repeated as already described and illustrated.

In the construction described above, all control devices are preferably composed of pneumatic pistons, but this does not exclude the possibility that they may be of oleodynamic type and that one or more of them may alternatively be of mechanical type, coupled with others of pneumatic and/or oleodynamic type. The entire sequence of the movements described and illustrated is controlled automatically by any known system, e.g. timers, or by mechanical limit stop devices or similar devices, or also by control means with programmed logic (PLC) with programmable electronic processors, or by unprogrammable electronic processor controllers.

The bolt/bolts 14 can also be equipped with controls independent from piston 21 as already described, or by means connected with the descent of upper mobile mold 9.

I claim:

1. A machine for molding a piece of a pasty product which comprises a conveyor belt (4) for said piece (5) to be molded, gripping means for said piece comprising a fork (2), a rear pneumatic piston (3) connected to said fork (2), said fork being aligned with said belt (4), a pusher (6) at the free end of said fork, adjustable jaws (7), a lower fixed die (8) and a mobile upper mold (9) aligned with said pusher; said lower die being fixed to pins (17), said jaws being aligned with said fixed die (8) and with said upper mobile mold (9), said conveyor belt (4) stopping when said piece (5) reaches the position of alignment with said fork and said rear piston (3) pushes said fork forward, said pusher pushing said piece between said jaws, and said piece is molded between said die (8) and said mold (9), a centering device for said lower die (8), said centering device comprising a bolt (14), a pneumatic piston (21) driving said bolt, said bolt in forward position engaging in a corresponding seat (15) formed on at least one first side lever (16) connected to said pins (17), said centering device fixing the lower die (8) when in alignment position with the upper mobile mold (9), extraction means (24) for extracting said bolt (14) after the molding operation is complete, said extraction comprising a pneumatic control piston (25) and suckers (26) fixed to the free end of the rod of said piston, a device for rotating said lower die (8) comprising at least one second side lever (16) fixed to said lower die (8) and supported at the end of a rod (19) of a pneumatic piston (20), said piston driving the lateral displacement of said second lever; said displacement causing the rotation of the die from alignment position with the upper mold (9) and with the extractor means (24) and vice versa.

2. The machine according to claim 1 wherein said upper mobile mold (9) is controlled by a pneumatic piston for the approach and return stroke and an oleodynamic piston for the molding stroke.

3. The machine according to claim 1 wherein at least one jaw (7) is supported at one end (10) and held in pressure-position by a spring (11) and is provided with position regulators (12) to calibrate the grip of the piece to be molded.

4. The machine according to claim 1 wherein said centering device is provided with stops (22), and when said bolt is inserted in said seat (15), said first side lever (16) is pushed into contact with said stops.

* * * * *